United States Patent [19]

Flory

[11] 3,728,850
[45] Apr. 24, 1973

[54] HARVESTING SWEEPER

[76] Inventor: Howard E. Flory, P.O. Box 908, Salida, Calif. 95368

[22] Filed: Dec. 30, 1971

[21] Appl. No.: 213,913

[52] U.S. Cl..................56/12.8, 56/328 R, 56/377, 56/DIG. 8
[51] Int. Cl. .............................................A01d 43/02
[58] Field of Search..............56/328 R, 12.8, 13.3, 56/377, DIG. 8; 15/340

[56] References Cited

UNITED STATES PATENTS

| 3,462,929 | 8/1969 | Ingalls | 56/328 R |
| 2,870,594 | 1/1959 | Larsh | 56/DIG. 8 |

*Primary Examiner*—Antonio F. Guida
*Attorney*—Robert G. West et al.

[57] ABSTRACT

A harvesting sweeper has an elongated carriage movable in the direction of the carriage length in an orchard. A vertically adjustable, angularly disposed brush reel at the forward end of the carriage is driven to displace fallen nuts to form a windrow parallel to the carriage length and along one side of the carriage. A blower on the rearward portion of the carriage simultaneously and variably operated with the brush reel, discharges air to the other side of the carriage in a direction transverse to the carriage length to displace nuts and leaves transversely from a path along that other side of the carriage to prepare that other side for the subsequent use of the brush reel.

5 Claims, 10 Drawing Figures

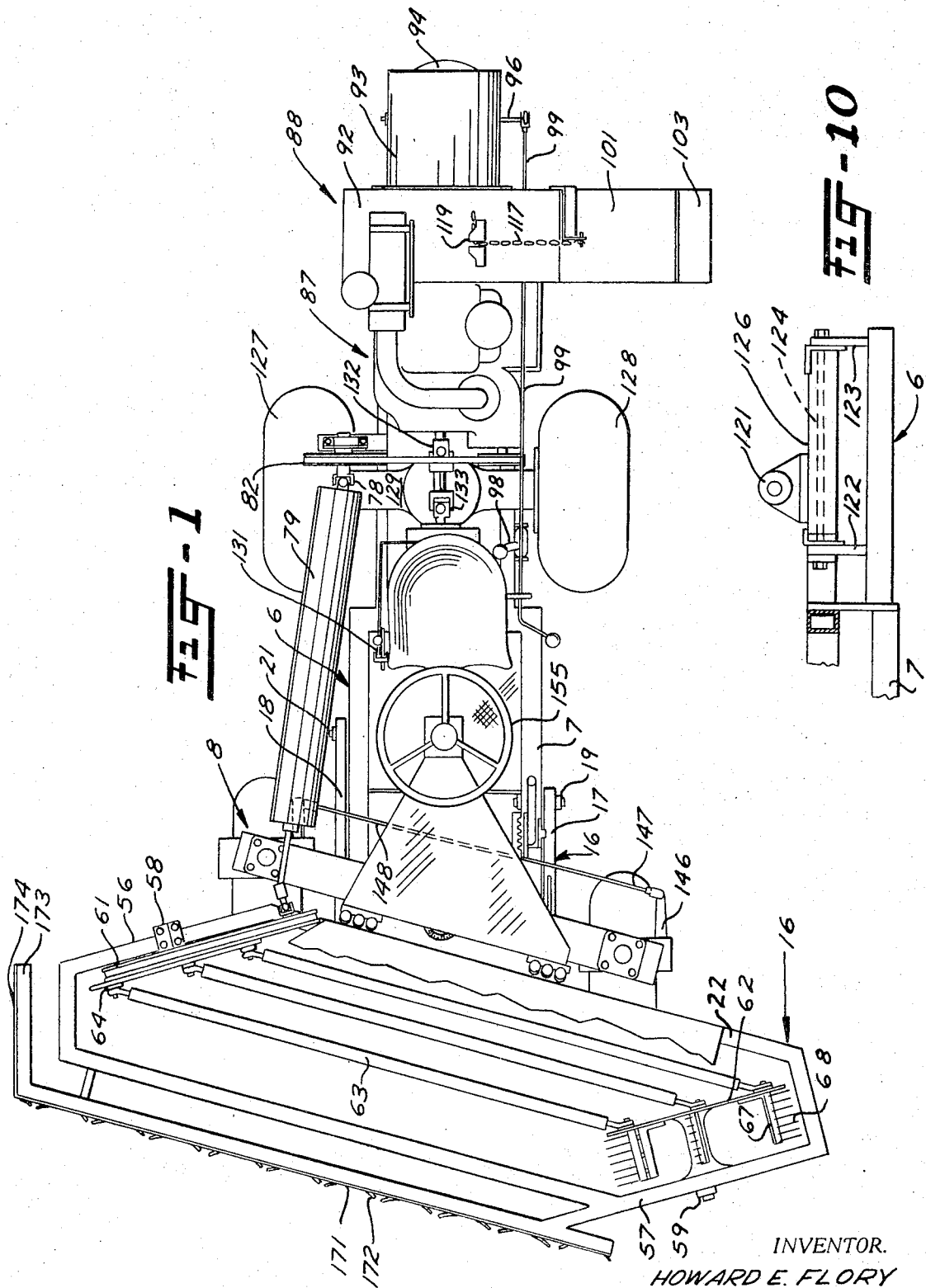

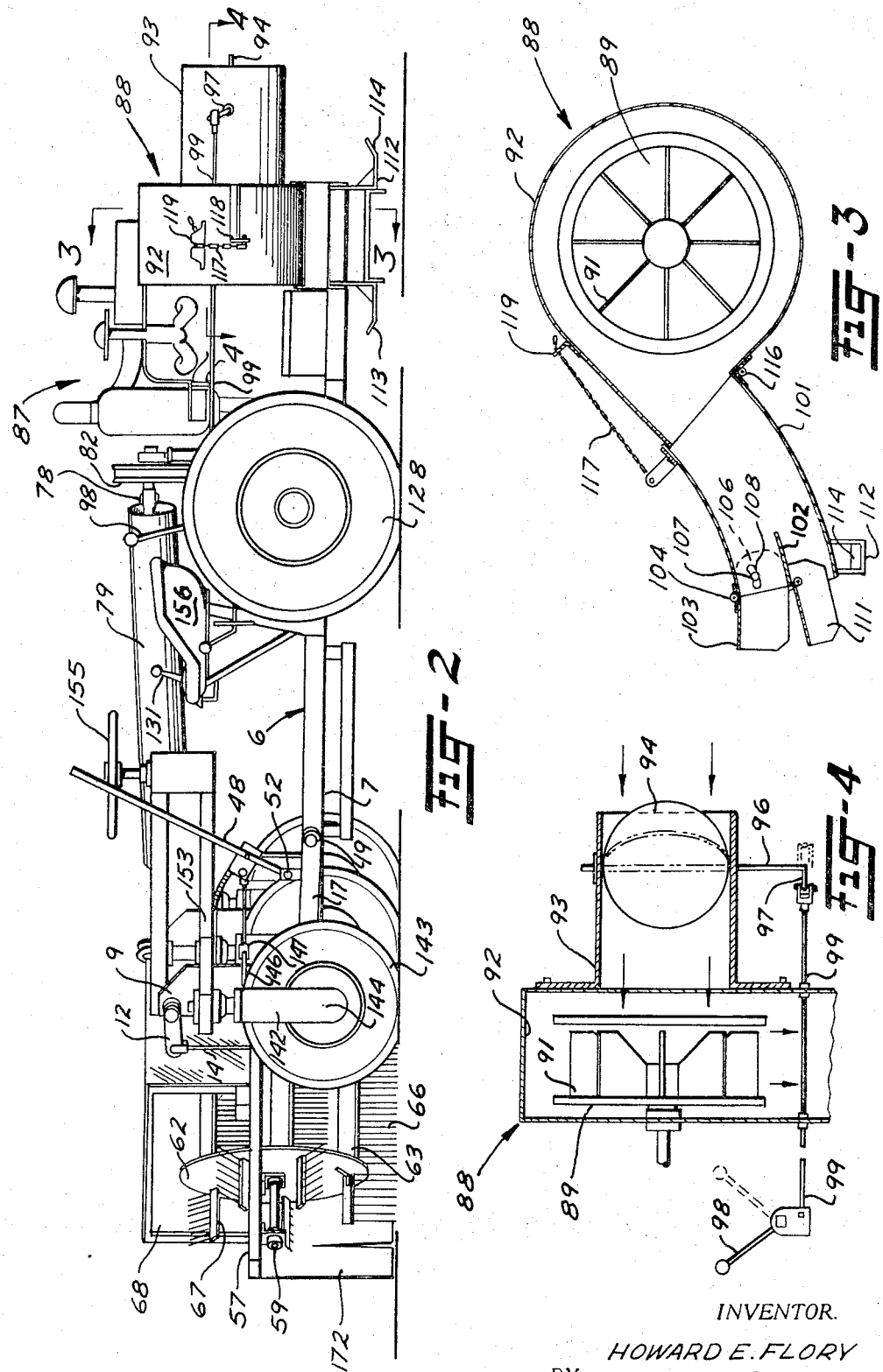

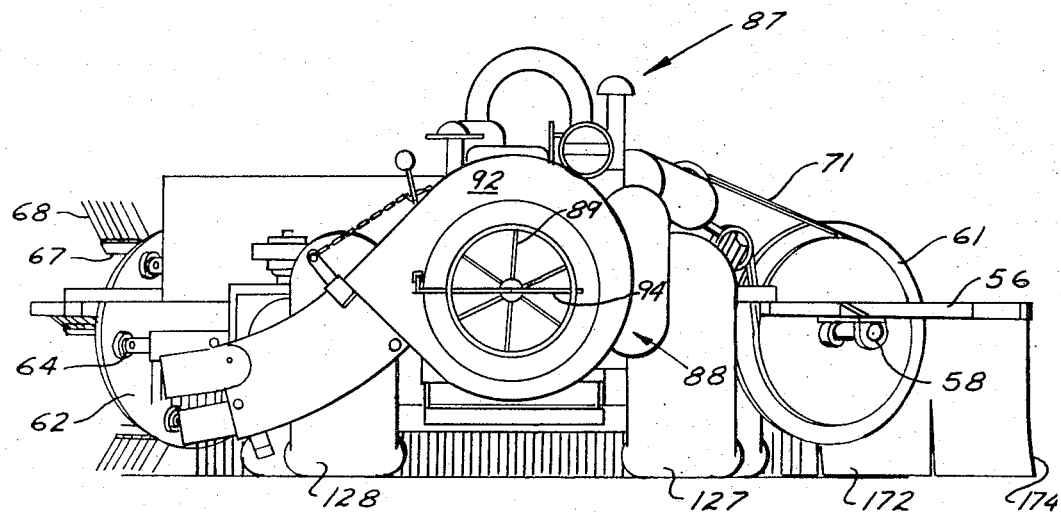
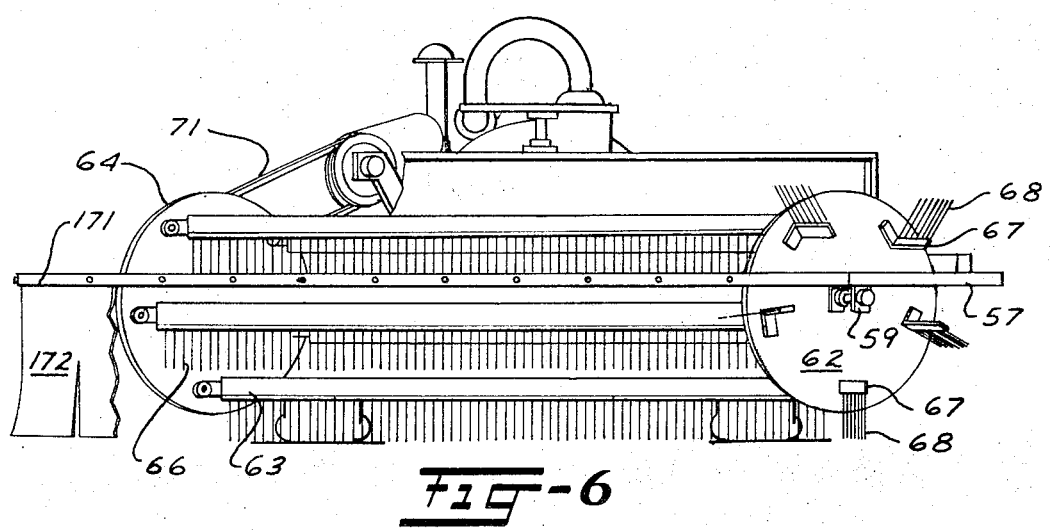

Patented April 24, 1973

INVENTOR.
HOWARD E. FLORY
BY Lothrop & West
ATTORNEYS

HARVESTING SWEEPER

The invention relates to machines especially useful in harvesting crops such as nuts; for example, almonds, walnuts, figs and the like, and is particularly concerned with a device for operation in a grove or orchard and having the capacity of directing nuts and leaves on the ground into a windrow for subsequent pick-up.

In devices of this sort it is highly desirable to make sure that all of the fallen nuts are assuredly moved from their fallen location into a row or windrow, usually disposed between adjacent rows of the trees, and remain there in a relatively narrow elongated mound.

Since the leaves which concurrently fall with the nuts are often effective to conceal and guard the fallen nuts, it is also advantageous to make sure that the leaves are removed to ascertain that the ground is swept virtually clean and that no nuts are left behind.

Another object of the invention is to provide a machine effective for use in an orchard even with relatively low-hanging branches and capable of being operated by one individual at a relatively high rate of speed to make sure that the nuts are quickly and easily arranged in windrow fashion.

Another object of the invention is to provide a machine which utilizes not only a positive means for dislodging and repositioning the fallen nuts, but likewise employs a relatively heavy blast of air to make sure that the nuts and leaves are appropriately handled.

Another object of the invention is to provide a machine which affords a relatively stable platform on which the sweeping parts of the machine operate despite undulations or variations in surface smoothness of the ground.

Another object of the invention is to provide a machine of the sort noted in which the power distribution is appropriate not only for propelling the machine itself but likewise for performing the various sweeping and blowing tasks assigned to it.

An additional object of the invention is to provide a machine which is economical to construct and operate and can be utilized from season to season without substantial deterioration.

A further object of the invention is to provide an improved form of harvesting sweeper.

Other objects together with the foregoing are attained in the embodiment of the invention described in the accompanying description and illustrated in the accompanying drawings, in which:

FIG. 1 is a plan of a harvesting sweeper constructed in accordance with the invention as it has been practically embodied;

FIG. 2 is a side elevation of the device of FIG. 1;

FIG. 3 is a cross-section, the plane of which is indicated by the line 3—3 of FIG. 2, showing a blower and attendant construction;

FIG. 4 is a cross-section, the plane of which is indicated by the line 4—4 of FIG. 2, also showing the blower and surrounding arrangements;

FIG. 5 is a rear elevation of the device;

FIG. 6 is a front elevation of the device, portions being broken away;

FIG. 10 is a fragmentary view approximately in section on a longitudinal vertical plane showing the articulation of the rear portion of the device with respect to the forward portion thereof.

Figure 7:
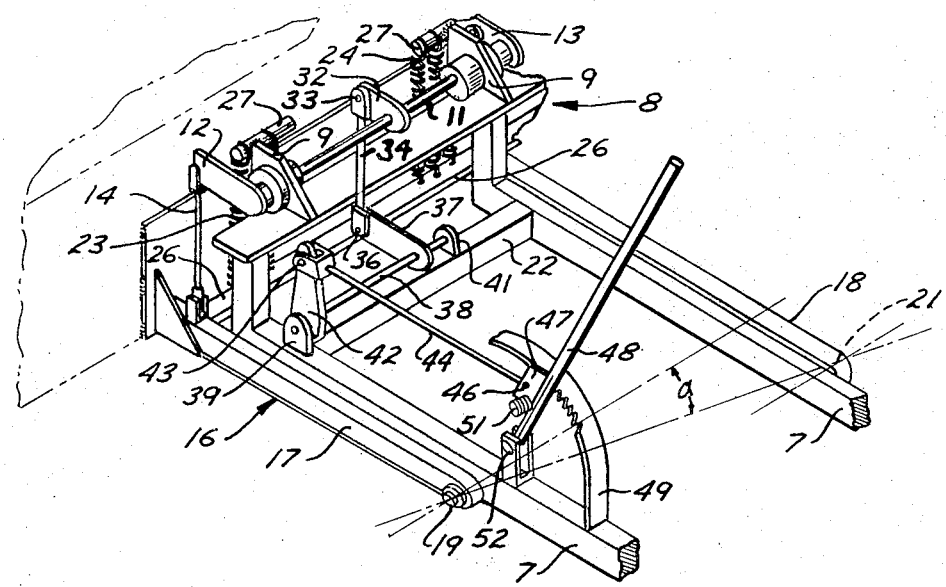
FIG. 7 is an isometric view, partially diagrammatic and having portions broken away, showing a part of the mechanism for suspending the forward portion of the machine.

For use in a walnut or almond orchard I have provided a harvesting sweeper including a longitudinally extending carriage adapted to advance in the direction of the length of the carriage. The sweeper has a main frame 6 including a forward portion 7 comprised of the customary channels and angles and extending forwardly to a superstructure 8 including bracket bearings 9 within which a shaft 11 is rotatably mounted. The shaft at each end carries crank arms 12 and 13 connected by adjustable clevis rods 14 to a canted or angled brush frame 16. This particularly includes a pair of side arms 17 and 18 pivoted to the main frame 6. It is particularly arranged that the frame arm 17 is connected to the forward portion 7 of the main frame by a relatively loose pivot connection 19 at a forward position, whereas the other arm 18 is connected to the forward portion 7 of the main frame by a relatively loose pivot connection 21 farther toward the rear. The virtual pivot axis between the pivots 19 and 21 is angled with respect to the longitudinal axis of the main frame, the angularity being the same as the angularity of the main cross bar 22 of the brush frame 16 extending across the forward portion 7 of the main frame 6.

Partly to counterbalance the weight of the brush frame, I provide a plurality of helical springs (FIG. 7) in groups 23 and 24. At their lower ends these are hooked into a cross bar 26 extending between the side arms 17 and 18 of the brush frame and at their upper ends are secured to anchors 27 connected to the superstructure 8. In this fashion part of the weight of the brush frame is transmitted through the springs to the main frame.

To adjust the vertical position of the brush frame with respect to the main frame, I preferably use the cross shaft 11 (FIG. 7) journalled in the bracket bearings 9 and connecting the crank arms 12 and 13. Between the ends of the cross shaft 11 I provide a lever 32 having a pivot connection 33 to a control rod 34 in turn having a pivot connection 36 to an arm 37 on an operating rod 38. Journals 39 and 41 mount the rod 38 for rotation on the forward portion 7 of the main frame 6. Upstanding from the rod 38 is an arm 42 having a pivot connection 43 to an operating rod 44 connected by a pivot pin 46 to a detent plate 47 pivoted on an operating lever 48. The detent plate is spring pressed by a spring 51 toward a ratchet strap 49 on the main frame 6. The lever 48 is mounted on the main frame by a pivot connection 52.

Normally the lever 48 is held immobile by engagement of the ratchet, but when desired the operator can displace the rod 48 laterally to disengage the ratchet and by moving the rod to and fro can rock the cross shaft 11 to lift and lower the brush frame. Since the brush frame is angled with respect to the longitudinal axis of the vehicle, when it is raised and lowered about the staggered pivots 19 and 21 the angularity is maintained and the bottom portion of the brush frame always remains approximately horizontal or level while in the vicinity of the ground and so does not dig in at one side or the other, but rests evenly thereon when sufficiently lowered.

The brush frame includes a pair of angled struts 56 and 57 (FIG. 1), each of which carries one of a pair of bearings 58 and 59. Each bearing in turn supports one of a pair of rotary disks 61 and 62 at a substantial angle to the line of advance of the vehicle. The two disks are thus rotatably mounted. Furthermore, the disks are joined by cranked angle bars 63, usually five in number, and are connected by individual, spaced pivots 64 to the plates 61 and 62. The axes of the pivotal connections and the axes of the journals or bearings 58 and 59 are all parallel, so that when one of the disks is revolved the entire unit or reel revolves about an angled, generally horizontal cross axis with the individual bars 63 orbiting about such axis. The bars, as particularly shown in FIG. 6, each carry depending fingers 66 conveniently of relatively yielding rubber or of spring wire effective to sweep the ground as the disks 61 and 62 and the bars 63 rotate. In addition, the disk 62 on its forward face carries a number of brackets 67 thereon, each of which also has a plurality of extending fingers 68 to assist in sweeping in a direction normal to the rotational axis of the bearing 59.

Figure 8:
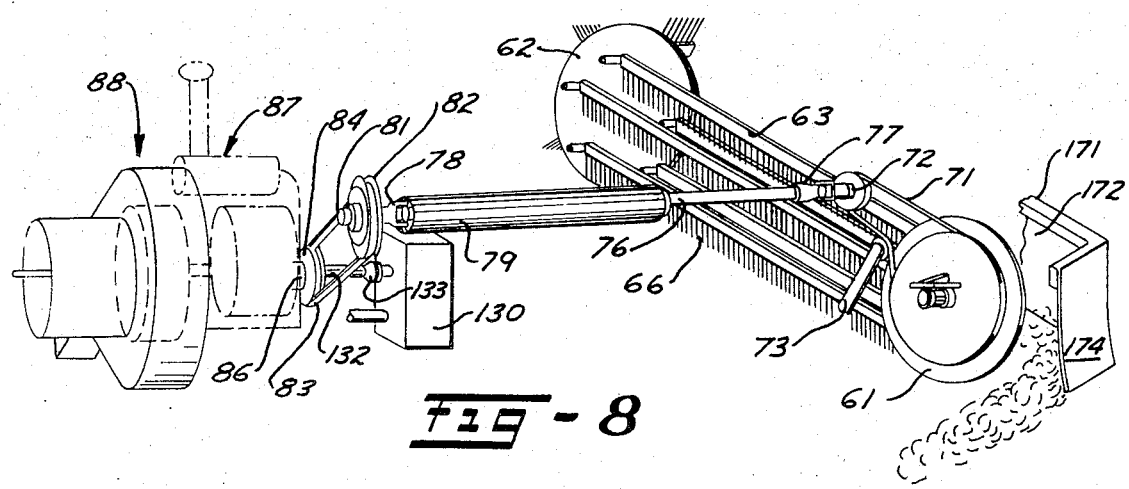
FIG. 8 is an isometric view, partly diagrammatic, showing the principal driving connections of the device.

To drive the rotary brush or reel on the brush frame, the wheel 61 is provided with a circumferential groove to receive a belt 71 connected to a drive pulley 72 appropriately supported on the frame and maintained taut by an idler wheel and its adjusting mount 73 (see FIG. 8). The drive to the pulley 72 is through a tumbler shaft 76 having a universal joint connection 77 at the forward end thereof and a universal joint connection 78 at the rearward end thereof. The intermediate portion of the shaft, which also preferably includes a longitudinal slip joint, is covered by a guard 79.

The universal joint 78 is joined to a pulley shaft 81 in turn connected by a pulley 82 and a belt 83 to a drive pulley 84 situated on a longitudinally disposed drive shaft 86 extending from the cranking end of an engine 87. This is any appropriate kind of prime mover and usually is a relatively small gasoline engine. When the engine is operating, the drive shaft transmits motion to and drives the forward brush or reel. In addition, the engine 87 has a drive connection to a blower fan 88. In this instance it is preferred to drive the fan 88 directly from the normal driving end of the crankshaft of the engine since a large portion of the power of the engine 87 is efficiently carried immediately to and used by the blower 88.

The blower includes a fan impeller 89 directly mounted on the end of the engine crankshaft and having its vanes 91 situated within a scroll housing 92. Axially extending from the scroll housing is an inlet tube 93 carrying a damper 94 disposed on a cross shaft 96 having a lever end 97. A conveniently accessible actuating lever 98 (shown ninety degrees out of position in FIG. 4) is joined by a connecting rod 99 to the lever end 97. The operator can open and close the damper and position it at any desired location in between.

Exit from the scroll housing 92 is into a transversely disposed duct 101 extending in a curve toward the ground laterally of the machine and having a dividing vane 102 near the outlet thereof. The upper channel so formed is continued by an extension 103 mounted on the housing by a hinge 104 and having a side wing 106 positioned by means of a tightening screw 107 operating in an arcuate slot 108. The vertical direction of the extension 103 can be set as desired. The other exit from the duct 101 below the dividing vane 102 is by means of a stationarily fastened extension 111 permanently inclined toward the ground and disposed to discharge on one side and transversely of the machine. In order to protect the extended portion of the fan or blower discharge duct, a shoe 112 having upturned ends 113 and 114 is secured to the lower portion of the duct 101.

Preferably the entire outlet duct is movable to any of several desired angles. For that reason the duct 101 is connected to the housing of the fan by a hinge 116 and is retained in any selected position by an adjusting chain 117. This is connected to an ear 118 on the duct 101 and adapted to be hooked into a bracket 119 on the scroll housing 92. In this fashion the operator by opening and closing the damper 94, by adjusting the position of the outlet housing 101, and particularly also by adjusting the relationship of the extension 103, can direct a relatively strong blast of air as desired transversely from one side of the machine and across the ground alongside of the machine end. When the blast is not needed or should be throttled, the damper can be partially or entirely closed. When the damper is closed, the power consumption by the blower is substantially reduced.

Particular means are provided for suspending or supporting the main frame on the ground in order that quite a stable bed can be afforded for the machinery. For that reason, as particularly shown in FIGS. 1 and 10, the main frame 6 extends rearwardly beneath a rear axle housing 121 of the usual sort. The frame 6 has a pair of upstanding ears 122 and 123 through which extends a longitudinal pivot rod 124 supporting a subframe 126 for oscillation about a horizontal, longitudinal axis. The axle housing 121 is secured to the subframe 126. At each end of the axle housing are disposed ground-engaging, pneumatic-tired wheels 127 and 128. With this arrangement, the wheels 127 and 128 can rise and fall or the axle housing 121 can rock transversely without unduly disturbing the forward portion 7 of the frame 6. The axle housing 121 includes a customary final drive gear housing 129 with a drive coupling joined to a hydrostatic transmission 130 (FIG. 8) under control of the operator by means of a lever 131. A pair of universal joints 132 and 133 (FIG. 1) and appropriate shafting connect the hydrostatic transmission directly to the forward end of the engine shaft 86.

Figure 9:
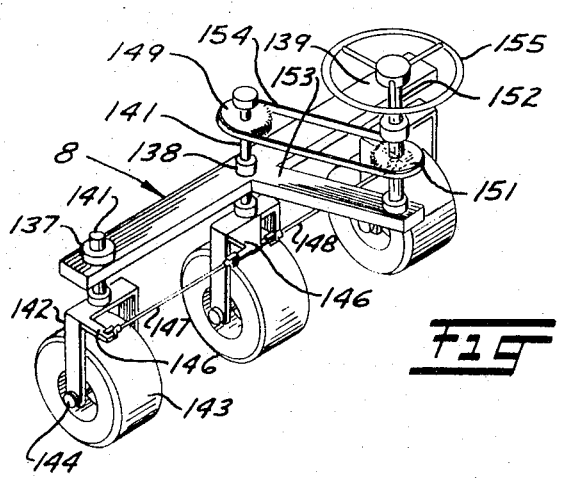
FIG. 9 is an isometric view, with major surrounding structures omitted, showing the principal steering arrangements of the machine.

To complement the rear wheel support connections, the forward end 7 of the main frame 6 is also particularly arranged and constructed. As especially illustrated in FIG. 9, the cross bar of the superstructure 8 is provided with three, substantially identical, thrust journals 137, 138 and 139. Each of these carries a vertically disposed steering spindle 141 with a subjacent support yoke 142 carrying a ground-engaging, pneumatic-tired wheel 143 rotatable on a yoke-supported axle 144. The three wheels are staggered, as seen from the side, at substantially the same angle as the brush frame. Being three in number and being rigidly connected, so far as rising and falling movement is concerned, to the main frame forward portion 7, the front wheels, despite the rocking activity of the rear wheels 127 and 128, maintain a stable platform for the brush. The various fingers or tines on the brush thus always have substantially even or equivalent contact with or are disposed equal distances from the ground.

To steer the three front wheels each of the yokes 142 is provided with a steering arm 146. The steering arms are cross connected by tie rods 147 and 148. The central one of the spindles 141 has an upward extension carrying a sprocket wheel 149 aligned with a similar sprocket wheel 151 on a steering column 152 upstanding from an extension 153 of the superstructure bar 8. A chain 154 joins the sprockets 149 and 151 and a steering wheel 155 is conveniently available to the operator sitting in a seat 156 at the operator's station on the main frame. By rotating the wheel 155, the operator turns the central spindle 141 and simultaneously rotates in a similar fashion the side spindles 141 through the connecting tie rods 147 and 148.

In preparing the machine for use in a particular locality, the operator can adjust the lever 48 to station the reel or brush at the desired distance above the ground. He can also set the extension 103 at the desired angle and can adjust the chain 117 vertically to position the air discharge duct as preferred. Upon assuming his station and starting the engine, he can initially close the damper 94 in order to conserve power. When ready, he can engage the hydrostatic transmission by operation of the lever 131 to start the machine on a desired path in the longitudinal direction of advance of the machine. The machine can be maneuvered in forward or rearward direction since the hydrostatic transmission has forward and reverse drive characteristics also useful as a brake during either direction of motion. When the machine has been appropriately maneuvered and steered into a position to travel down a row between trees, the transmission is engaged in its forward condition and the steering wheel is worked to guide the machine in a path clear of the trees but usually operating quite close to the trunks thereof.

As the machine advances, the drive shaft 76 is impelled and the front brush reel is rotated with the individual disks 61 and 62 turning about their respective axes in the journals 58 and 59. The cross bars 63 with their extended tines or fingers thus are successively moved down to the ground or into a close approach to the ground and are revolved in such a direction as to brush any encountered nuts and leaves generally forwardly and laterally to one side, say the right side, of the machine.

To prevent the tines or fingers from throwing nuts to an excessive distance, the brush frame 16 has a forward extension 171 extending generally parallel to the angle bars 63 at the leading end of the machine. The extension 171 carries a number of depending flexible flaps 172 to intercept any nuts that might be thrown unduly far forwardly. The frame extension 171 preferably terminates in a return bend 173 having its own shrouds 174 and disposed adjacent the end of the machine to leave a rearwardly disposed opening substantially in line with the windrow of nuts to be deposited.

As the machine advances and the brush revolves, the nuts are transferred somewhat forwardly and particularly laterally and bounce against either the forward flaps 172 or the side shrouds 174 and are arrested in the space near the shrouds 174 to come to rest in a longitudinal windrow on the ground on the right hand side of the machine and generally parallel to the direction of advance of the machine and to the row of tree trunks. Also swept to one side are leaves and other debris randomly on the ground.

The sweeping is made much more efficacious if the usual blanket of fallen leaves overlying the nuts is previously removed, at least in part. Consequently, as the machine travels along one row, effectuating a mechanical sweeping operation, a blast of air is discharged transversely of the direction of machine advance and on one side, or the left side, of the machine through the fan or blower duct 101. This carries with great velocity into the next sweeping space or aisle between the adjacent rows of trees and blows away as many as possible of the deposited leaves. In practice, enough horsepower is used to drive the blower so that a strong transverse air blast is effective over a ground distance of twenty to 25 feet. The adjacent aisle is thus first prepared by transversely blowing the leaves away for the subsequent traverse of the machine in the adjacent aisle to brush the nuts to one side in a windrow. If the full power of the air blast is not needed, the operator by partially or entirely closing the damper can correspondingly cut off the blast of air and economically reduce the power of the engine.

It is thus possible in one traverse of one row to prepare the ground in the next row for subsequent nut withdrawing by blowing the leaves away and also blowing any nuts and leaves away from the base of the trees into the next row. Each pass of the machine is therefore effective to eliminate the need for hand sweeping around the base of the trees.

Concurrently the nut material in the path of the machine is brushed into a windrow on the side opposite the transverse air blast for subsequent pickup.

What is claimed is:

1. A harvesting sweeper for harvesting one orchard row and for simultaneously preparing the adjacent orchard row for harvesting comprising a main frame adapted to advance in a predetermined direction in said one row and having a forward portion, drive wheels for supporting the rearward portion of said main frame on the ground, means connecting said drive wheels and said main frame for oscillation about a longitudinally extending axis parallel to said predetermined direction, steering wheels for supporting the forward portion of said main frame on the ground, means connecting said steering wheels and said main frame against relative vertical movement, a brush frame disposed at an angle across the front of said main frame, means for connecting said brush frame and said main frame for pivotal movement about a horizontal axis extending at said angle, a brush reel mounted on said brush frame for rotation in a direction to discharge nuts in a windrow parallel to said axis and on one side of said main frame, an air blower on said main frame remote from said brush reel, means for directing air from said blower to discharge transversely of said axis on the other side of said main frame and toward said adjacent row to blow leaves transversely from said adjacent row, and means on said main frame for simultaneously driving said brush reel and said blower.

2. A harvesting sweeper as in claim 1 including means for varying the vertical direction and amount of lateral discharge from said air blower.

3. A harvesting sweeper as in claim 2 in which said air blower has an air inlet and said varying means includes a damper disposed in said air inlet and movable into different positions to control the extent of said transverse air discharge.

4. A harvesting sweeper as in claim 1 in which said driving means includes an engine having a crankshaft with a portion projecting therefrom parallel to the longitudinal axis of said main frame and said air blower includes a rotor mounted on the projecting portion of said crankshaft and includes a scroll housing directed to discharge air in a downward transverse direction behind said drive wheels.

5. A harvesting sweeper as in claim 1 including an engine having crankshaft portions projecting from both sides of said engine and arranged substantially on the longitudinal axis of said main frame behind said drive wheels, means for connecting said crankshaft portion at the front of said engine to drive said drive wheels, an air blower rotor mounted on said crankshaft portion at the rear of said engine, and an air blower scroll housing surrounding said rotor and directed to discharge transversely toward the ground on one side of said frame behind one of said drive wheels.

* * * * *